United States Patent
Kumar et al.

(10) Patent No.: US 12,418,351 B2
(45) Date of Patent: Sep. 16, 2025

(54) SYSTEM AND DESIGN METHOD OF A CLOCK SYNCHRONIZER FOR A COMBINED CENTRALIZED AND DISTRIBUTED UNIT

(71) Applicant: JIO PLATFORMS LIMITED, Ahmedabad (IN)

(72) Inventors: Narender Kumar, Delhi (IN); Shakti Singh, Gurgaon (IN); Amrish Bansal, Navi Mumbai (IN); Brijesh Shah, Navi Mumbai (IN); Bajinder Pal Singh, Jankpuri (IN); Selvakumar Ganesan, Tirupur (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 18/247,452

(22) PCT Filed: Mar. 24, 2023

(86) PCT No.: PCT/IB2023/052922
§ 371 (c)(1),
(2) Date: Mar. 31, 2023

(87) PCT Pub. No.: WO2023/187572
PCT Pub. Date: Oct. 5, 2023

(65) Prior Publication Data
US 2025/0015915 A1    Jan. 9, 2025

(30) Foreign Application Priority Data
Mar. 31, 2022   (IN) .............................. 202221019338

(51) Int. Cl.
*H04J 3/06*     (2006.01)
*H04W 56/00*    (2009.01)

(52) U.S. Cl.
CPC .......... *H04J 3/0667* (2013.01); *H04J 3/0688* (2013.01); *H04W 56/001* (2013.01)

(58) Field of Classification Search
CPC .... H04J 3/0667; H04J 3/0688; H04W 56/001
See application file for complete search history.

(56) References Cited

U.S. PATENT DOCUMENTS

| 2013/0157593 A1 | 6/2013 | Achanta |
| 2019/0327010 A1 | 10/2019 | Wang et al. |

(Continued)

FOREIGN PATENT DOCUMENTS

| CN | 201928290 U | 8/2011 |
| CN | 105429725 A | 3/2016 |

(Continued)

OTHER PUBLICATIONS

International Search Report, PCT/IB2023/052922, mailed Jul. 17, 2023, Total pp. 04.

*Primary Examiner* — Alpus Hsu
(74) *Attorney, Agent, or Firm* — FINNEGAN, HENDERSON, FARABOW, GARRETT & DUNNER, LLP (57) ABSTRACT

Disclosed are methods and systems for a synchronizer system including a global positioning system (GPS) and a boundary clock. The method includes: generating, by the GPS of the synchronizer system, a first clock signal having a first predefined frequency; locking the first clock signal generated by the GPS at the first predefined frequency; and generating, by the boundary clock of the synchronizer system, a second clock signal having a second predefined frequency, to provide the second clock signal to a combined centralized and distributed unit (CCDU) system.

13 Claims, 6 Drawing Sheets

(56) References Cited

U.S. PATENT DOCUMENTS

| | | | |
|---|---|---|---|
| 2020/0162366 A1* | 5/2020 | Vrzic | H04L 45/16 |
| 2021/0400527 A1* | 12/2021 | Notargiacomo | H04W 28/0289 |
| 2022/0248351 A1* | 8/2022 | Ueda | H04W 56/0015 |
| 2022/0248352 A1* | 8/2022 | Ueda | H04W 56/0015 |
| 2022/0268943 A1* | 8/2022 | Gomez | G01S 19/23 |
| 2023/0354232 A1* | 11/2023 | Sriram | H04W 56/0015 |

FOREIGN PATENT DOCUMENTS

| | | |
|---|---|---|
| ES | 2523703 A2 | 11/2014 |
| WO | 2021257526 A1 | 12/2021 |

\* cited by examiner

SYSTEM AND DESIGN METHOD OF A CLOCK SYNCHRONIZER FOR A COMBINED CENTRALIZED AND DISTRIBUTED UNIT

FIELD OF INVENTION

The embodiments of the present disclosure generally relate to telecommunication basement application. More particularly, the present disclosure relates to design of a clock synchronizer of a combined centralized and distributed unit (CCDU).

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

The fifth generation (5G) technology is expected to fundamentally transform the role that telecommunications technology plays in the industry and society at large. A gNodeB is a 3GPP-compliant implementation of a 5G-NR base station. It consists of independent Network Functions, which implement 3GPP-compliant NR Radio access network (RAN) protocols namely: physical layer (PHY), media access control layer (MAC), radio link control (RLC), Packet Data Convergence Protocol (PDCP), service data adaptation protocol (SDAP), radio resource control (RRC), Network Real-time Analysis Platform (NRAP) as shown in FIG. 1. The gNB further incorporates three functional modules: the CU, the DU and the Radio Unit (RU), which can be deployed in multiple combinations. They can run together or independently and can be deployed on either physical (e.g. a small cell chipset) or virtual resources (e.g. dedicated COTS server or shared cloud resources). The CU provides support for the higher layers of the protocol stack such as SDAP, PDCP and RRC while the DU provides support for the lower layers of the protocol stack such as radio link control (RLC), media access control (MAC) and Physical layer. In a 5G radio access network (RAN) architecture, the DU in the baseband unit (BBU) is responsible for real time Layer 1 and Layer 2 scheduling functions of the 5G protocol stack layer and the CU is responsible for non-real time, higher L2 and L3 of the 5G protocol stack layer.

However, in existing architecture the DU and the CU units are physically separate and require exhaustive and complex methodologies and protocol support for the splitting of the gNB into the DU and CU. If the CU and DU are embedded together, synchronization issues both internal to the system as well as external might arise.

Hence, there is a need in the art to provide for a design of a clock synchronizer module to enable a compact CCDU that can overcome the shortcomings of the existing prior art.

OBJECTS OF THE PRESENT DISCLOSURE

Some of the objects of the present disclosure, which at least one embodiment herein satisfies are as listed herein below.

An object of the present disclosure is to provide a system in a single unit to reduce cost and increase reliability.

An object of the present disclosure is provide for a synchronizer Hardware design that synchronizes all the components associated with the CCDU in the SoC on board.

SUMMARY

This section is provided to introduce certain objects and aspects of the present invention in a simplified form that are further described below in the detailed description. This summary is not intended to identify the key features or the scope of the claimed subject matter.

In order to achieve the aforementioned objectives, the present invention provides a synchronizer system in a combined centralized and distributed unit (CCDU) system. The system may include a single integrated board, the single integrated board further comprising: a housing comprising a clock synchronizer module. The clock synchronizer module further may include a Boundary clock (BC) with one or more synchronization blocks; one or more precision timing protocol (PTP) engines; and a global positioning system (GPS). The GPS is a primary source of clocking that supports hold over a predefined time interval. The BC, the one or more PTP engines and the GPS function in co-ordination to provide synchronization to one or more components of the CCDU.

In an embodiment, the one or more PTP engines may be a secondary source of synchronization that may automatically get activated in the absence of the GPS.

In an embodiment, a GPS Holdover operatively coupled to the synchronizer system gets activated in the absence of both the GPS and the one or more PTP engines.

In an embodiment, the clock synchronizer module may be configured to take decision in enabling a priority of synchronization over the GPS with the one or more PTP or the GPS Holdover and do not require any manual intervention.

In an embodiment, the clock synchronizer module may synchronize the system within the single board and may further synchronize one or more external components associated with the system.

In an embodiment, the clock and synchronization module may further include an Ultra-low noise clock generation phase locked loops (PLLs), a Programmable oscillator and a System Synchronizer.

In an aspect, the present invention provides a method for facilitating synchronization to a combined centralized and distributed unit (CCDU) system by a synchronizer system. The method may include the steps of generating a clock signal, by a global positioning system (GPS), of a predefined frequency, wherein the GPS is the primary synchronizer module, locking the clock signal generated by the GPS at the predefined frequency, and generating, by a Boundary clock (BC), a second clock signal of a second predefined frequency to provide the second clock signal for synchronizing one or more components of the CCDU system.

In an embodiment, the method may include the step of reading one or more National Marine Electronics Association (NMEA) packets in a predefined time range via a communication channel by the GPS based on the clock signal generated.

In an embodiment, the method may include the step of generating a predefined Precision Time Protocol (PTP) packet, by one or more one or more precision timing protocol (PTP) engines, with a predefined reference clock and phase information obtained from the clock signal, wherein the one or more PTP engines is the secondary synchronizer module.

In an embodiment, the method may include the step of locking the clock signal by the one or more PTP engines in case the GPS fails, wherein the secondary module acts a slave.

In an embodiment, the method may include the step of providing a plurality of clock signals by the one or more PTP engines by recovering the plurality of clock signals from a backhaul network.

In an embodiment, the method may include the step of entering a hold over mode by a GPS holdover when both the GPS and the one or more PTP engines fail to perform.

In an aspect, the present disclosure relates to a non-transitory computer readable medium including processor-executable instructions that cause a processor to generate a clock signal, by a global positioning system (GPS), of a predefined frequency, wherein the GPS is a primary synchronizer module, lock the clock signal generated by the GPS at the predefined frequency, and generate, by a Boundary clock (BC), a second clock signal of a second predefined frequency to provide the second clock signal for synchronizing one or more components of a combined centralized and distributed unit (CCDU) system.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the disclosure, various embodiments are described using terms used in some communication standards (e.g., 3rd generation partnership project (3GPP), extensible radio access network (xRAN), and open-radio access network (O-RAN)), but these are merely examples for description. Various embodiments of the disclosure may also be easily modified and applied to other communication systems.

Typically, a base station is a network infrastructure that provides wireless access to one or more terminals. The base station has coverage defined to be a predetermined geographic area based on the distance over which a signal may be transmitted. The base station may be referred to as, in addition to "base station," "access point (AP)," "evolved NodeB (eNodeB) (eNB)," "5G node (5th generation node)," "next generation NodeB (gNB)," "wireless point," "transmission/reception point (TRP)," or other terms having equivalent technical meanings.

Further, a protocol stack or network stack is an implementation of a computer networking protocol suite or protocol family for a telecommunication system consisting of a plurality of network devices. A 5G protocol stack may include layer-1 (L1) which is a PHYSICAL Layer. The 5G layer-2 (L2) may include MAC, RLC and PDCP. The 5G layer-3 (L3) is the RRC layer.

The present invention provides an efficient hardware architecture for an ORAN compliant clock synchronizer module of a combined centralized unit and a distributed unit (CCDU) for a 5G basement application required for processing L1, L2 and L3 scheduling of the network. The CCDU design may provide the functionality of a CU and a DU with single unit and can operate over wide temperature range. A single board approach of the CCDU make the CCDU more reliable and less costly. The CCDU can support different kinds of synchronization and can provide site alarms over dry contacts to equip with external alarm device. In this description, numerous specific details such as logic implementations, types and interrelationships of system components, etc., may be set forth in order to provide a more thorough understanding of some embodiments. It will be appreciated, however, by one skilled in the art that the invention may be practiced without such specific details. In other instances, control structures, gate level circuits, and/or full software instruction sequences have not been shown in detail in order not to obscure the invention. Those of ordinary skill in the art, with the included descriptions, will be able to implement appropriate functionality without undue experimentation.

Figure 1A:
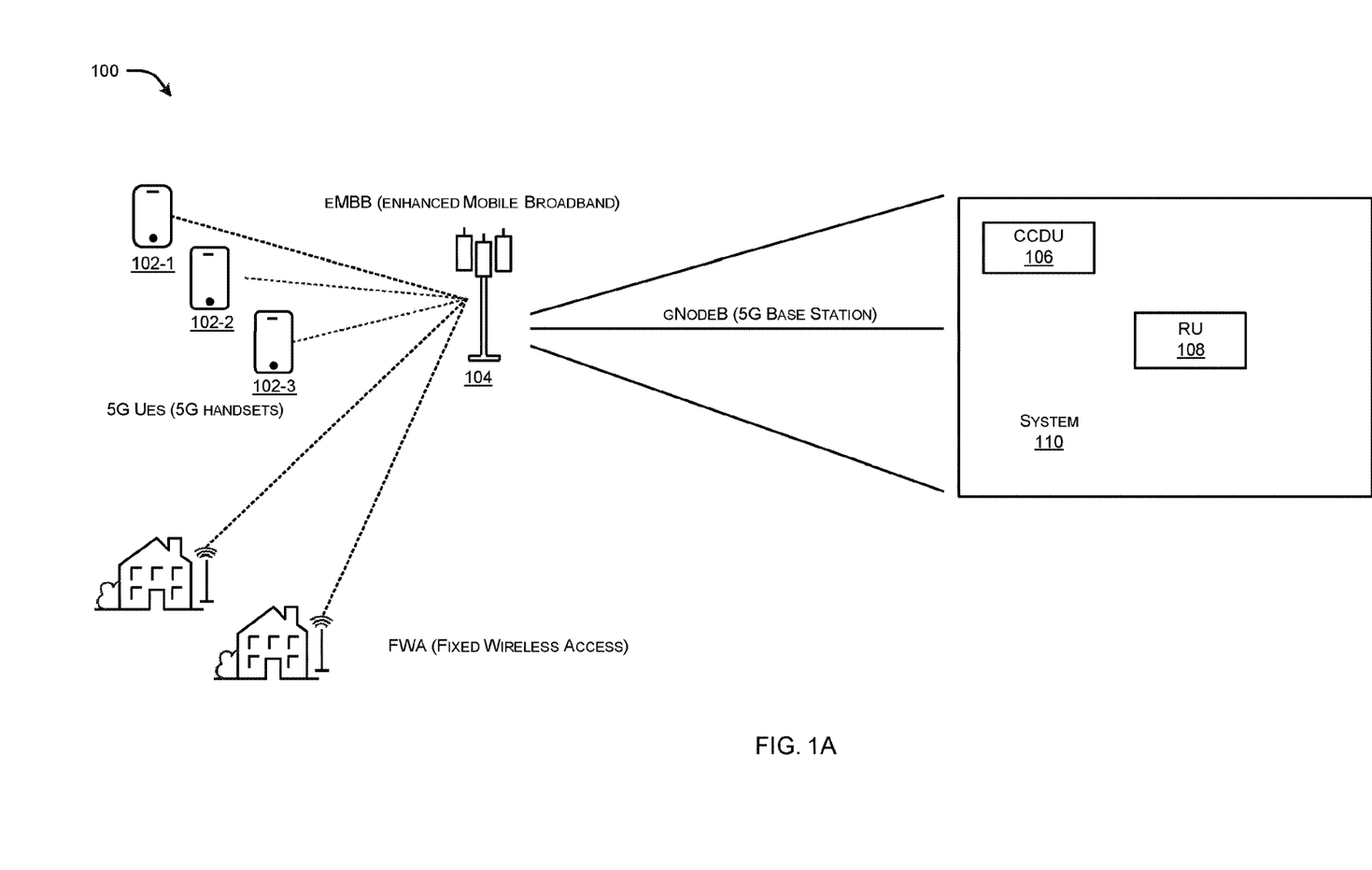
FIG. 1A illustrates an exemplary network architecture in which or with which proposed system of the present disclosure can be implemented, in accordance with an embodiment of the present disclosure.

Referring to FIG. 1A that illustrates an exemplary network architecture for a 5G New radio (NR) network (100) (also referred to as network architecture (100)) in which or with which the proposed system (110) can be implemented, in accordance with an embodiment of the present disclosure. As illustrated, the exemplary network architecture (100) may be equipped with the proposed system (110) that may be associated with a 5G base station (104) (also referred to as gNodeB (104)). The gNodeB (104) may include at least three functional modules such as a centralized unit (CU), a distributed unit (DU) and a radio unit (RU). The gNodeB may be communicatively coupled to a plurality of first computing devices (102-1, 102-2, 102-3 . . . 102-N) (interchangeably referred to as user equipment (102-1, 102-2, 102-3 . . . 102-N) and (individually referred to as the user equipment (UE) (124) and collectively referred to as the UE (102)) via an Open radio access network Radio Unit (O-RU) (114).

Figure 1B:
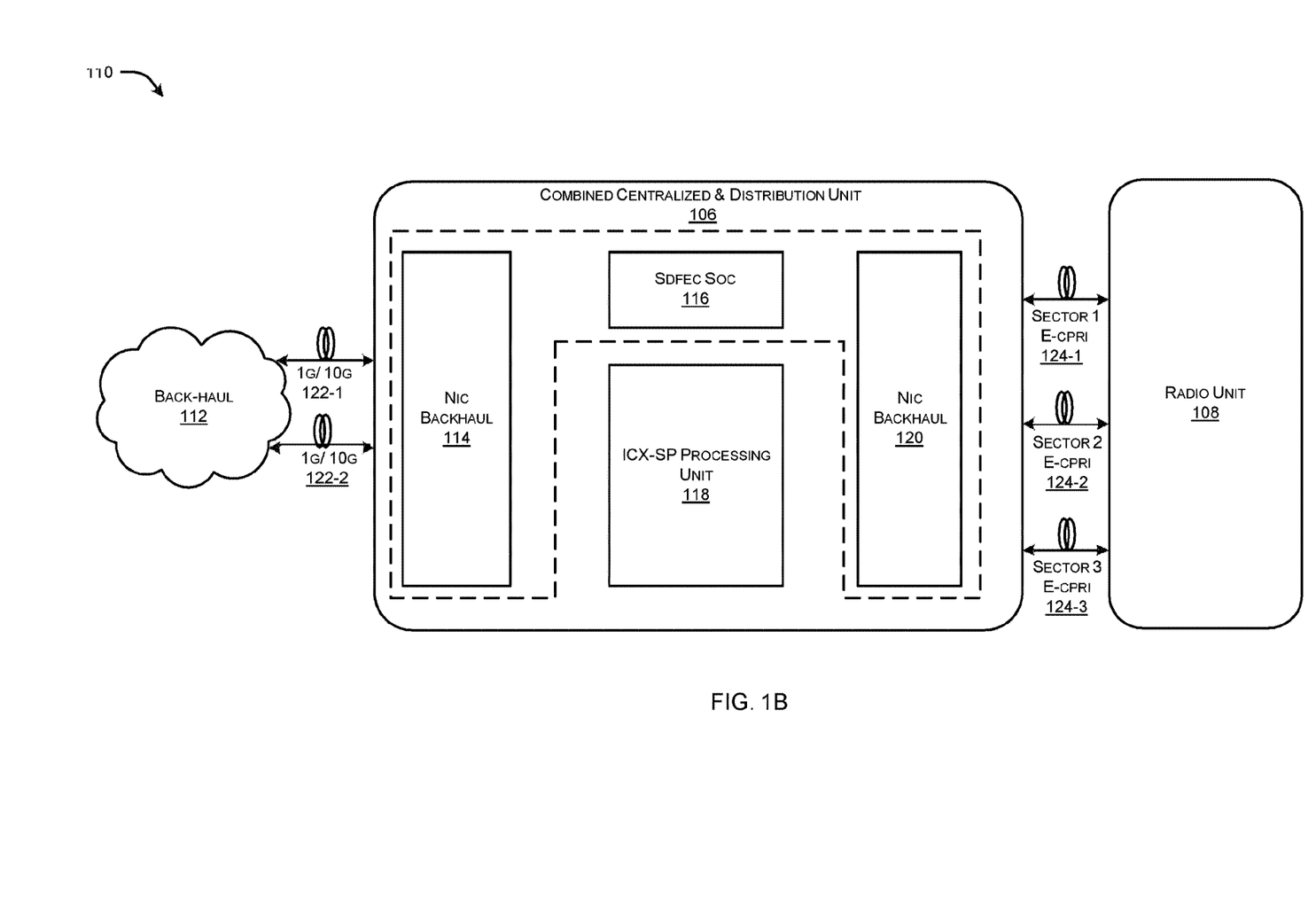
FIG. 1B illustrates an exemplary system architecture of the combined centralized and distributed unit (CCDU), in accordance with an embodiment of the present disclosure.

In an exemplary embodiment, the system (110) may be configured with a combined CU and DU in a single platform or PCB and is simply referred to as CCDU (106) as illustrated in FIG. 1B. The CCDU (106) may be operatively coupled to a radio unit (RU) (108) via one or more Network interface card (NIC) cards such as a backhaul Network interface card (NIC) (114), a fronthaul NIC (116), and the like. The CCDU (106) may include a processing unit (118), an accelerator unit that may include a Soft-Decision Forward Error Correction (SD-FEC) module (116), a local area network controller unit comprising the backhaul Network interface card (NIC) (114), the fronthaul NIC (116), and the like. The backhaul NIC (114) may be further communicatively coupled to a backhaul network (112).

Figure 2:
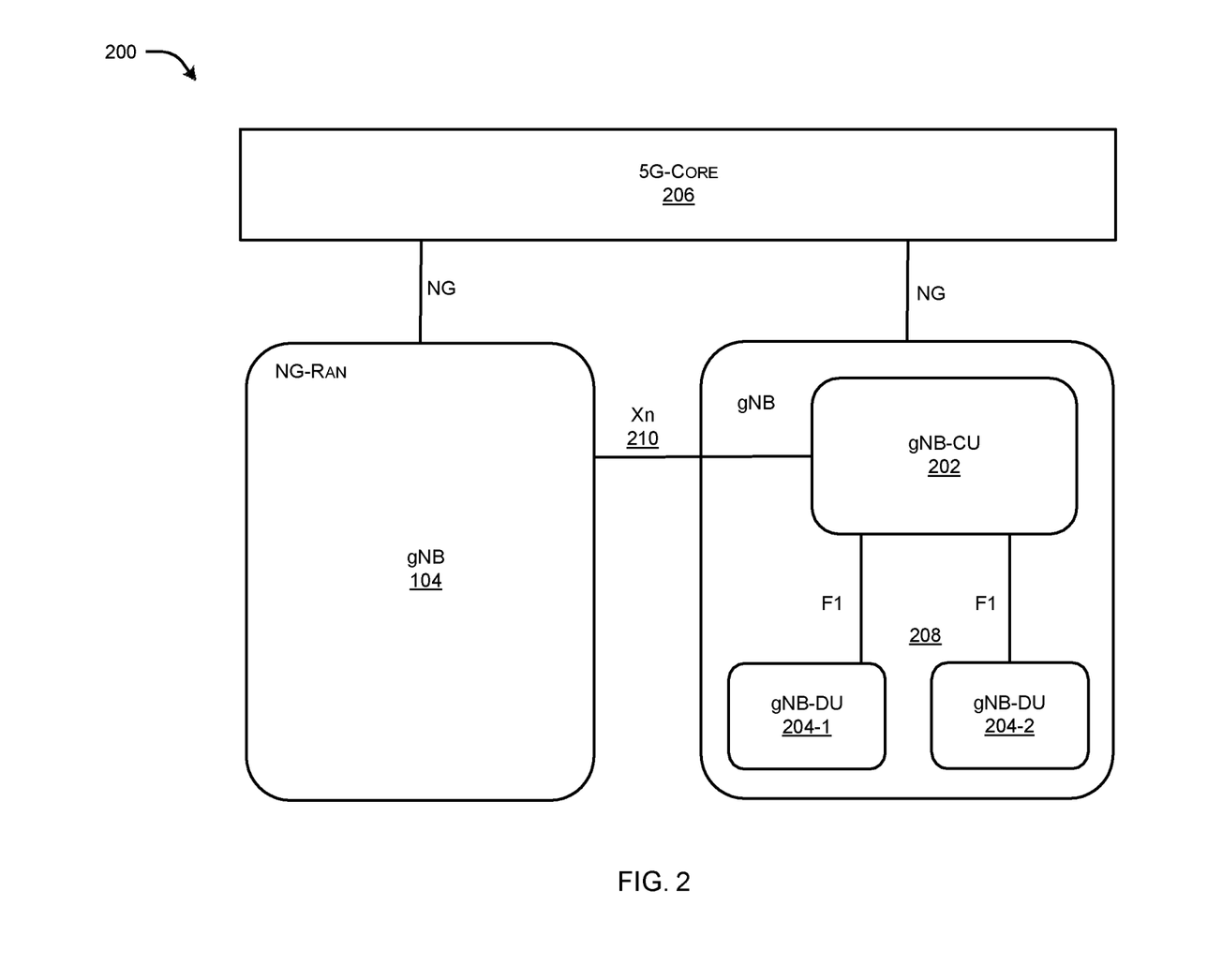
FIG. 2 illustrates an exemplary existing representation of a Centralized unit and a distributed unit of a gNodeB.

Generally, an existing gNodeB internal structure (200) for a 5G core (206) is shown in FIG. 2 where it can be quite clear to a person not skilled in the art that the existing CU (202) and DU (204) are separate units connected by an F1 interface (208).

Figure 3:
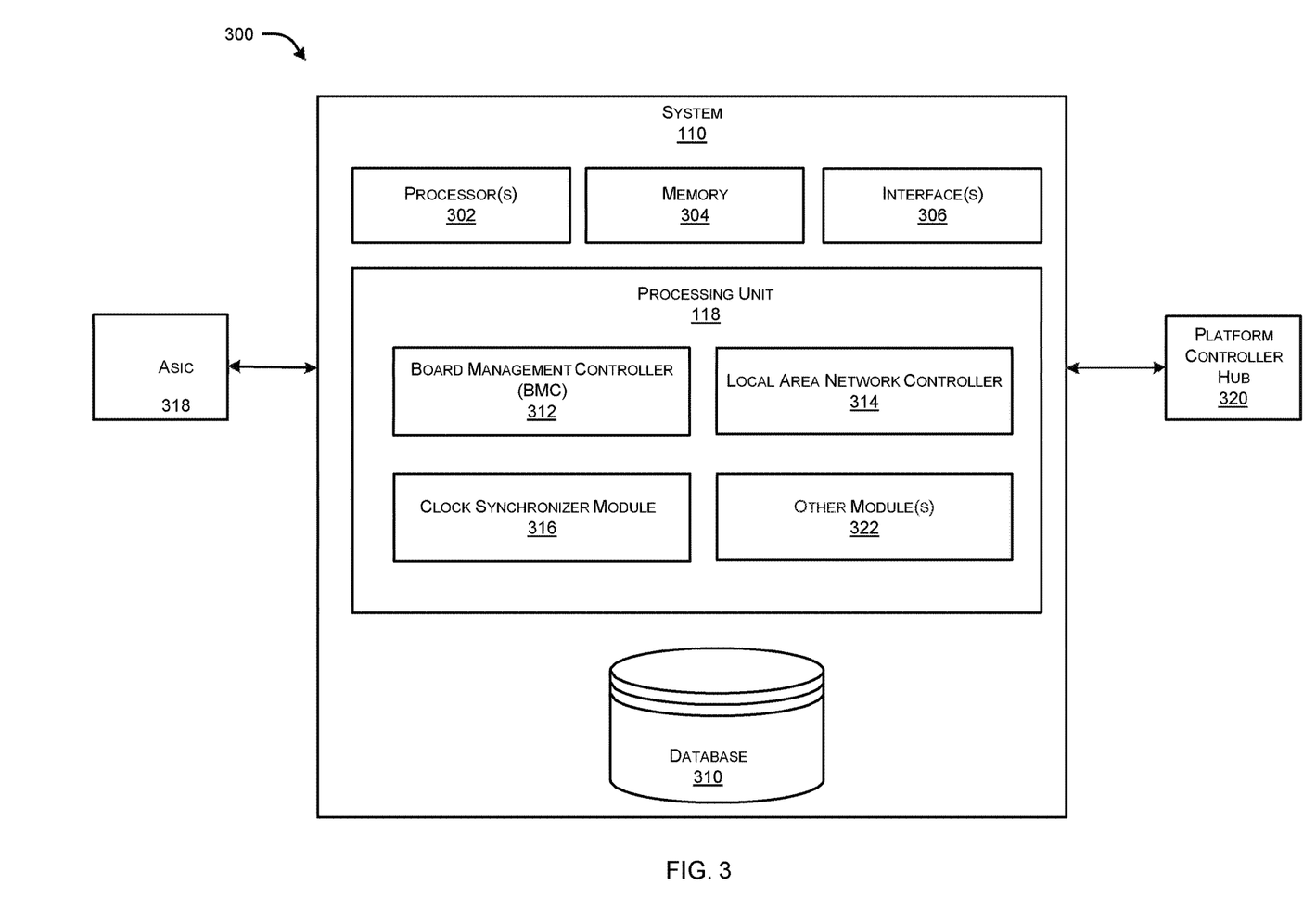
FIG. 3 illustrates an exemplary synchronizer system of the CCDU, in accordance with an embodiment of the present disclosure.

In an exemplary embodiment, as illustrated in FIG. 3, the system (110) or the CCDU (106) may include one or more processors coupled with a memory, wherein the memory may store instructions which when executed by the one or more processors may cause system (110) to perform L1 and L2 functionalities. The one or more processor(s) (302) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (302) may be configured to fetch and execute computer-readable instructions stored in a memory of the CCDU (106). The memory may be configured to store one or more computer-readable instructions or routines in a non-transitory computer-readable storage medium, which may be fetched and executed to create or share data packets over a network service. The memory (304) may comprise any non-transitory storage device including, for example, volatile memory such as RAM, or non-volatile memory such as EPROM, flash memory, and the like.

In an embodiment, the system (110) may include a plurality of interfaces (306). The interfaces (306) may comprise a variety of interfaces, for example, interfaces for data input and output devices, referred to as I/O devices, storage devices, and the like. The interfaces (306) may facilitate communication of the system (110) with a plurality of platforms such as a platform controller hub (320) and an FPGA or an ASIC (318) comprising of (System on Chip) SoC components associated with the functioning of CCDU (106). In an exemplary embodiment, the SoC may include but not limited to the Soft-Decision Forward Error Correction (SD-FEC) module (116). The interface(s) (306) may also provide a communication pathway for one or more components of the CCDU (106). Examples of such components include, but are not limited to, processing unit/engine(s) (118) and a database (310).

In an exemplary embodiment, the CCDU (106) may be designed for an outdoor application to operate over a predefined temperature range and a predefined environment condition unlike COTS (Commercial of the shelfs) servers which are used in AC environment. For example, the predefined temperature range may go be from 0° to at least 60° C. in desert and other tropical and equatorial areas while predefined environment condition may include dry, humid, cold or dusty environment.

In an exemplary embodiment, the CCDU in the single board can have a chip down approach wherein one or more components corresponding to the NIC cards may be part of the single board that increases the mean time between failures (MTBF) and reduces the costs significantly. Since, the components are all combined in a single board hence separate components (cards) may not be required rather a single board may be used which will reduce not only the process of manufacturing but also will reduce the cost and increase the system reliability.

In an exemplary embodiment, the system (110) may be assembled in a single board (interchangeably referred to as LAN on motherboard (LOM)) having a predefined number of layers. The predefined number of layers ensure that the system is not bulky and heavy. In a way of example but not limitation, the predefined number of layers can be at least 14. In an example the system (110) may include one or more network connections directly connected to the LOM. Instead of requiring a separate network interface card to access a local-area network, such as Ethernet, the circuits may be attached to the single board. An advantage of the system (110) can be an extra available peripheral component interconnect (PCI) slot that is not being used by a network adapter.

In an exemplary embodiment, the system (110) may include at least Four (×4) 25G Fiber Optic (SFP) but not limited to it as a fronthaul connection to the fronthaul NIC (116) on but not limited to an eCPRI protocol and at least two (×2) 10G Fiber Optic (SFP) as a backhaul connection to the backhaul network (112).

In an exemplary embodiment, the system (110) may be further coupled to one or more alarm devices (not shown in the FIG. 1B) that may send alarm signals over dry contacts, temperature rise, critical environment conditions and critical electronic conditions. The system (110) may operate in a standard telecom power supply of −48 VDC but not limited to it with all required protection for telecom sites.

The processing unit/engine(s) (118) may be implemented as a combination of hardware and programming (for example, programmable instructions) to implement one or more functionalities of the processing unit (118). In the examples described herein, such combinations of hardware and programming may be implemented in several different ways. For example, the programming for the processing unit (118) may be processor-executable instructions stored on a non-transitory machine-readable storage medium and the hardware for the processing unit (118) may comprise a processing resource (for example, one or more processors), to execute such instructions. In the present examples, the machine-readable storage medium may store instructions that, when executed by the processing resource, implement the processing unit (118). In accordance with such examples, the system (110) may include the machine-readable storage medium storing the instructions and the processing resource to execute the instructions, or the machine-readable storage medium may be separate but accessible to the CCDU (106) and the processing resource. In other examples, the processing engine(s) (118) may be implemented by electronic circuitry.

The processing unit (118) may include one or more modules/engines selected from any of a base mode management controller (BMC) (312), Local area Network controllers (314) (interchangeably referred to as the Ethernet controllers (314) herein), a clock synchronizer module (316), and other module(s) (322). In an example, the processing unit may be but not limited to a 32 core processing engine. The memory (204) may include but not limited to a 256 GB random access memory (RAM).

Clock Synchronizer Module:

In an exemplary embodiment, the clock synchronizer module (316) may include a clock synchroniser that may support a Boundary clock (BC) with synchronization blocks such as but not limited to IEEE 1588 and one or more precision timing protocol (PTP) engines, having a global positioning system (GPS) as a primary source of clocking that should support hold over of a predefined time range that may be at least 24 hrs but not limited to it. For example, the boundary clock implements a local PTP clock which can be synchronized to a master on one port and act as a master on other ports. Since a boundary clock is a full PTP clock implementation, both the time and frequency must be simultaneously updated to the local PTP clocks on each PHY. The boundary clocks may have main reference clock 156.25 MHz from front haul to backhaul. The Front haul may have a built-in 1588 engine that may generate 1588 PTP packet on front haul networks with 156.25 MHz reference clock and phase information from 1PPS clock.

In an embodiment, the GPS will lock and generate a predefined clock signal such as 1PPS clock but not limited to it. The GPS 1PPS is further used to generate 1PPS signal out for fronthaul, backhaul, fronthaul sync PHY of the CCDU. In an exemplary embodiment, NMEA packets are read from the GPS by a driver through interfaced with Platform Controller Hub (PCH) (UART over USB). The synchronizer system may further provide frequency reference clock 156.25 MHz to fronthaul that can generate a 1588 PTP packet with 156.25 MHz reference clock and phase information from 1PPS clock.

In an exemplary embodiment, the one or more PTP engines can be the secondary source of synchronization and may automatically activate in the absence of the GPS. In case of GPS failure, the one or more PTP engines switches and locks to 1PPS. The one or more PTP engines may be equipped with an 1588 PTP engine that will act as PTP slave once find a PTP master on the 10G/1G backhaul network and further may provide two 1PPS signals that may be recovered from a backhaul network and also provide reference 1PPS clock to front haul and sync E PHY.

In an exemplary embodiment, a GPS Holdover may get activated in the absence of both the GPS and the one or more PTP. In an embodiment, the clock synchronizer module may be configured to take decision in enabling a priority of synchronization over the GPS the one or more PTP or the GPS Holdover and do not require any manual intervention. In an exemplary embodiment, the clock synchronizer module (316) can synchronize the system (110) within the single board and further can synchronize external components associated with the system (110) using a clock and synchronization circuit on board. In an exemplary embodiment, the clock and synchronization circuit on board may include an Ultra-low noise clock generation phase locked loops (PLLs), a Programmable oscillator and a System Synchronizer.

In an exemplary embodiment, the clock synchronizer module (316) may further handle holdover requirement as per telecom standards.

In an exemplary embodiment, a communication network may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, some combination thereof.

In an embodiment, the one or more user equipments (102) may communicate with the system (110) via set of executable instructions residing on any operating system, including but not limited to, Android™, iOS™, Kai OS™ and the like. In an embodiment, the one or more user equipments (102) and the one or more mobile devices may include, but not limited to, any electrical, electronic, electro-mechanical or an equipment or a combination of one or more of the above devices such as mobile phone, smartphone, Virtual Reality (VR) devices, Augmented Reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. It may be appreciated that the one or more user equipments (102), and the one or more mobile devices may not be restricted to the mentioned devices and various other devices may be used. A smart computing device may be one of the appropriate systems for storing data and other private/sensitive information.

Figure 4:
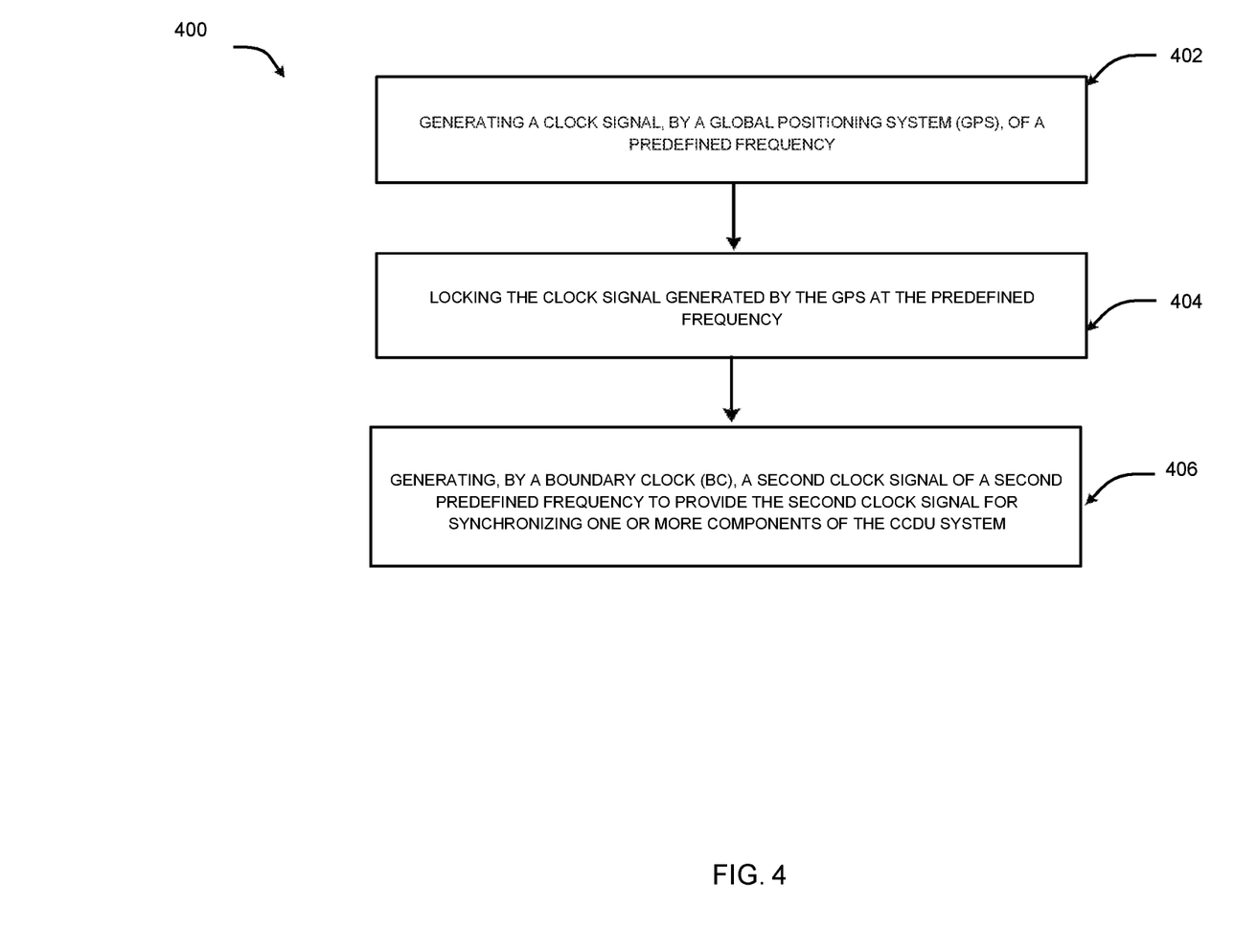
FIG. 4 illustrates an exemplary method flow diagram of the synchronizer system, in accordance with an embodiment of the present disclosure.

FIG. 4 illustrates an exemplary method flow diagram (400) of the synchronizer system, in accordance with an embodiment of the present disclosure. The method may facilitate synchronization of a combined centralized and distributed unit (CCDU) system by a synchronizer system.

The method may include at 402, the step of generating, by a global positioning system (GPS), a clock signal of a predefined frequency, wherein the GPS is the primary synchronizer module. For example, the GPS will lock and generate a predefined clock signal such as 1PPS clock but not limited to it. The GPS 1PPS is further used to generate 1PPS signal out for fronthaul, backhaul, fronthaul sync PHY of the CCDU.

The method may include at 404, locking the clock signal generated by the GPS at the predefined frequency.

The method may further include at 406, the step of generating, by a Boundary clock (BC), a second clock signal of a second predefined frequency to provide the second clock signal for synchronizing one or more components of the CCDU system. For example, the boundary clock implements a local PTP clock which can be synchronized to a master on one port and act as a master on other ports. Since a boundary clock is a full PTP clock implementation, both the time and frequency must be simultaneously updated to the local PTP clocks on each PHY. The boundary clocks may have main reference clock 156.25 MHZ from front haul to backhaul. The Front haul may have a built-in 1588 engine that may generate 1588 PTP packet on front haul networks with 156.25 MHz reference clock and phase information from 1PPS clock.

In an embodiment, the method may include the step of reading one or more NMEA packets in a predefined time range via a communication channel by the GPS based on the clock signal generated.

In an embodiment, the method may include the step of generating a predefined Precision Time Protocol (PTP) packet, by one or more one or more precision timing protocol (PTP) engines, with a predefined reference clock and phase information obtained from the clock signal, wherein the one or more PTP engines is the secondary synchronizer module.

In an embodiment, the method may include the step of locking the clock signal by the one or more PTP engines in case the GPS fails, wherein the secondary module acts a slave.

In an embodiment, the method may include the step of providing a plurality of clock signals by the one or more PTP engines by recovering the plurality of clock signals from a backhaul network.

In an embodiment, the method may include the step of entering a hold over mode by a GPS holdover when both the GPS and the one or more PTP engines fail to perform.

Exemplary Computer System 500

Figure 5:
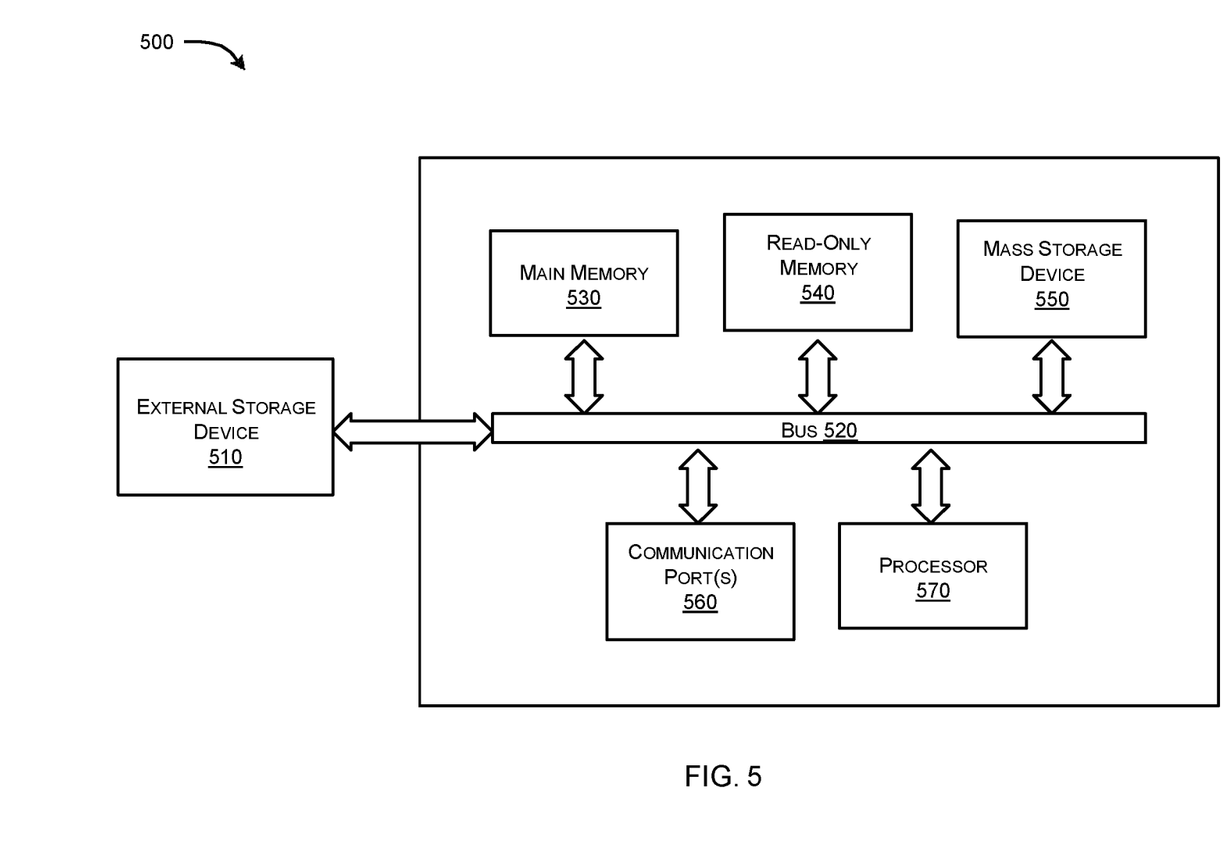
FIG. 5 illustrates an exemplary computer system in which or with which embodiments of the present invention can be utilized in accordance with embodiments of the present disclosure.

FIG. 5 illustrates an exemplary computer system in which or with which embodiments of the present invention can be utilized in accordance with embodiments of the present disclosure. As shown in FIG. 5, computer system 500 can include an external storage device 510, a bus 520, a main memory 530, a read only memory 540, a mass storage device 550, communication port 560, and a processor 570. A person skilled in the art will appreciate that the computer system may include more than one processor and communication ports. 5Processor 570 may include various modules associated with embodiments of the present invention. Communication port 560 can be any of an RS-232 port for use with a modem based dialup connection, a 10/100 Ethernet port, a Gigabit or 10 Gigabit port using copper or fibre, a serial port, a parallel port, or other existing or future ports. Communication port 560 may be chosen depending on a network, such a Local Area Network (LAN), Wide Area Network (WAN), or any network to which computer system connects. Memory 530 can be Random Access Memory (RAM), or any other dynamic storage device commonly known in the art. Read-only memory 540 can be any static storage device(s) e.g., but not limited to, a Programmable Read Only Memory (PROM) chips for storing static information e.g., start-up or BIOS instructions for processor 570. Mass storage 550 may be any current or future mass storage solution, which can be used to store information and/or instructions.

Bus 520 communicatively couples with processor(s) 570 with the other memory, storage and communication blocks. Bus 520 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 570 to software system.

Optionally, operator and administrative interfaces, e.g. a display, keyboard, and a cursor control device, may also be coupled to bus 520 to support direct operator interaction with a computer system. Other operator and administrative interfaces can be provided through network connections connected through communication port 560. 5Components described above are meant only to exemplify various possibilities. In no way should the aforementioned exemplary computer system limit the scope of the present disclosure.

Thus, the present disclosure provides a unique and efficient clock synchronizer for a Combined centralized and Distributed Unit (CCDU) that can provide the functionality of CU and DU with a single box solution. The CCDU is designed for the outdoor application to operate over wide temperature range and different environment condition unlike Commercial of the shelf (COTs) servers which are used in AC environment quiet often. The CCDU have a chip down approach where all the components corresponding to the NIC cards are part of the single board which increases the Mean Time Between Failures (MTBF) and reduces cost significantly.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner. The patent document includes systems and methods as defined in 3GPP Technical Specification (TS) 38.816 and the like.

ADVANTAGES OF THE PRESENT DISCLOSURE

The present disclosure provides for a system in a single unit to reduce cost and increase reliability.

The present disclosure provides for a synchronizer Hardware design that synchronizes all the components associated with the CCDU in the SoC on board.

We claim:

1. A synchronizer system configured to facilitating synchronization of a combined centralized and distributed unit (CCDU) system, said synchronizer system comprising:
    a single integrated board comprising
    a housing; and
    a clock synchronizer disposed within the housing, the clock synchronizer comprising:
       a global positioning system (GPS) configured to function a primary source of clocking and to generate a first clock signal having a first predefined frequency, the GPS supporting holdover of a predefined time interval;
       one or more precision timing protocol (PTP) engines; and
       a boundary clock with one or more synchronization blocks, the boundary clock being configured to generate a second clock signal having a second predefined frequency, the second clock signal being provided to the CCDU system for the synchronization.

2. The synchronizer system as claimed in claim 1, wherein the one or more PTP engines are a secondary source of synchronization, wherein the one or more PTP engines automatically activate in the absence of the GPS.

3. The synchronizer system as claimed in claim 1, wherein a GPS holdover operatively coupled to the synchronizer system gets activated in the absence of both the GPS and the one or more PTP engines.

4. The synchronizer system as claimed in claim 1, wherein the clock synchronizer is configured to take a decision in enabling a priority of synchronization over the GPS with the one or more PTP or a GPS holdover without a manual intervention.

5. The synchronizer system as claimed in claim 1, wherein, the clock synchronizer synchronizes a system within the single board and further synchronizes one or more external components associated with the system.

6. The synchronizer system as claimed in claim 1, wherein the clock synchronizer further comprises an Ultra-low noise clock generation phase locked loops (PLLs), a Programmable oscillator, and a System Synchronizer.

7. A method for a synchronizer system comprising a global positioning system (GPS) and a boundary clock, said method comprising:
    generating, by the GPS of the synchronizer system, a first clock signal having a first predefined frequency;
    locking the first clock signal generated by the GPS at the first predefined frequency; and
    generating, by the boundary clock of the synchronizer system, a second clock signal having a second predefined frequency, to provide the second clock signal to a centralized and distributed unit (CCDU) system.

8. The method as claimed in claim 7, wherein the method comprises:
    reading one or more National Marine Electronics Association (NMEA) packets in a predefined time range via a communication channel by the GPS based on the first clock signal generated.

9. The method as claimed in claim 7, wherein synchronizer system further comprises one or more precision timing protocol (PTP) engines, and the method further comprises:
    generating, by the one or more one or more PTP engines, a predefined PTP packet with a predefined reference clock and phase information obtained from the first clock signal.

10. The method as claimed in claim 7, wherein the method comprises:
    locking the first clock signal by the one or more PTP engines in case the GPS fails, wherein the one or more PTP engines acts a slave.

11. The method as claimed in claim 10, wherein the method comprises:
    providing a plurality of clock signals by the one or more PTP engines by recovering the plurality of clock signals from a backhaul network.

12. The method as claimed in claim 7, wherein the method comprises:
   entering a holdover mode by a GPS holdover when both the GPS and the one or more PTP engines fail to perform.

13. A non-transitory computer readable medium that are executable by one or more processors of a synchronizer system comprising a global positioning system (GPS) and a boundary clock, to perform a method, the method comprising:
   generating, by the GPS of the synchronizer system, a first clock signal having a first predefined frequency;
   locking the first clock signal generated by the GPS at the first predefined frequency; and
   generating, by the boundary clock of the synchronizer system, a second clock signal having a second predefined frequency, to provide the second clock signal to a centralized and distributed unit (CCDU) system.

* * * * *